(12) United States Patent
Lee et al.

(10) Patent No.: US 12,510,819 B2
(45) Date of Patent: Dec. 30, 2025

(54) OPTICAL PROXIMITY CORRECTION SYSTEM AND OPERATING METHOD

(71) Applicant: SAMSUNG ELECTRONICS CO., LTD., Suwon-si (KR)

(72) Inventors: Hee-Jun Lee, Seoul (KR); Sang Wook Kim, Yongin-si (KR); Heung Suk Oh, Bucheon-si (KR); Jee Eun Jung, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 647 days.

(21) Appl. No.: 17/873,260

(22) Filed: Jul. 26, 2022

(65) Prior Publication Data

US 2023/0194975 A1 Jun. 22, 2023

(30) Foreign Application Priority Data

Dec. 17, 2021 (KR) .......................... 10-2021-0181473

(51) Int. Cl.
*G06F 30/392* (2020.01)
*G03F 1/36* (2012.01)

(52) U.S. Cl.
CPC .............. *G03F 1/36* (2013.01); *G06F 30/392* (2020.01)

(58) Field of Classification Search
CPC .......... G03F 1/76; G03F 7/70441; G03F 1/36; G03F 7/70508; G03F 7/70616; G03F 7/706835; G03F 7/70291; G06F 2201/82; G06F 8/31; G06F 8/42; G06F 11/3006; G06F 30/327; G06F 21/57; G06F 2119/18; G06F 30/392; G06F 3/067; G06F 9/3842; G06F 1/206; G06F 30/20; G06F 30/17; G06F 9/5072; H01L 22/20; H01L 2924/00
USPC ...................................................... 716/50–56
See application file for complete search history.

(56) References Cited

U.S. PATENT DOCUMENTS

| | | | |
|---|---|---|---|
| 6,453,452 B1 | 9/2002 | Chang et al. | |
| 6,792,593 B2 | 9/2004 | Takashima et al. | |
| 7,003,756 B2 | 2/2006 | Zhang | |
| 7,043,712 B2 | 5/2006 | Mukherjee et al. | |
| 7,082,596 B2 | 7/2006 | Liu | |
| 7,165,234 B2 | 1/2007 | Pierrat | |
| 7,251,806 B2 | 7/2007 | Melvin, III | |
| 7,260,812 B2 | 8/2007 | Melvin, III et al. | |
| 2004/0019869 A1 | 1/2004 | Zhang | |
| 2005/0002334 A1* | 1/2005 | Chao | H04L 49/253 370/230 |

(Continued)

FOREIGN PATENT DOCUMENTS

| | | |
|---|---|---|
| KR | 10-2016-0132167 A | 11/2016 |
| KR | 1020210045265 A | 4/2021 |

*Primary Examiner* — Binh C Tat
(74) *Attorney, Agent, or Firm* — Muir Patent Law, PLLC

(57) ABSTRACT

An optical proximity correction system and an operating method are provided. Provided is an optical proximity correction system comprising, a plurality of patch blocks which include a plurality of patches including a segment information table, a plurality of slave devices which receive the segment information table from the plurality of patch blocks to generate a minimum patch table, and a master device which receives the minimum patch table from the plurality of slave devices, generates a segment average calculation table, and performs an optical proximity correction on the patches recorded in the segment average calculation table.

17 Claims, 12 Drawing Sheets

(56) References Cited

U.S. PATENT DOCUMENTS

| 2013/0263069 | A1* | 10/2013 | Park | G06F 30/327 |
|---|---|---|---|---|
| | | | | 716/104 |
| 2015/0067619 | A1* | 3/2015 | Hsuan | G03F 1/36 |
| | | | | 716/53 |

* cited by examiner

FIG. 7

| patch ID | Total # of hash ID in patch | # of hash ID | Hash ID |
|---|---|---|---|
| PA11 | 2000 | 9 | 0x78 |
| PA11 | 2000 | 5 | 0x81 |
| PA11 | 2000 | 2 | 0x93 |
| PA11 | 2000 | 2 | 0x1A |
| ... | ... | ... | ... |

⋮

| patch ID | Total # of hash ID in patch | # of hash ID | Hash ID |
|---|---|---|---|
| PAn1 | 2500 | 8 | 0x78 |
| PAn1 | 2500 | 7 | 0x85 |
| PAn1 | 2500 | 3 | 0x93 |
| ... | ... | ... | ... |

| patch ID | Total # of hash ID in patch | # of hash ID | Hash ID |
|---|---|---|---|
| PAn1 | 2500 | 8 | 0x78 |
| PAn1 | 2500 | 7 | 0x85 |
| PA11 | 2000 | 5 | 0x81 |
| PAn1 | 2500 | 3 | 0x93 |
| PA11 | 2000 | 2 | 0x1A |
| ... | ... | ... | ... |

— 151

⋮

— 12n

| patch ID | Total # of hash ID in patch | # of hash ID | Hash ID |
|---|---|---|---|
| PA1n | 2800 | 7 | 0x78 |
| PAnn | 1500 | 6 | 0x81 |
| PA1n | 2800 | 2 | 0x93 |
| PAnn | 1500 | 4 | 0x1C |
| PA2n | 1000 | 1 | 0x1B |
| ... | ... | ... | ... |

— 15n

OPTICAL PROXIMITY CORRECTION SYSTEM AND OPERATING METHOD

CROSS-REFERENCE TO RELATED APPLICATION

This application claims priority from Korean Patent Application No. 10-2021-0181473 filed on Dec. 17, 2021, in the Korean Intellectual Property Office, and all the benefits accruing therefrom under 35 U.S.C. 119, the contents of which in its entirety are herein incorporated by reference.

BACKGROUND

1. Field

Embodiments relate to an optical proximity correction system and an operating method.

2. Description of the Related Art

With rapid development of an electronic industry in recent years, there has been an increasing demand for electrical devices having higher performance, higher reliability, and smaller size. The electronic device is implemented as semiconductor elements manufactured by a semiconductor manufacturing process. Therefore, in order to satisfy such requirement, the structure of the semiconductor device becomes gradually complicated and highly integrated.

SUMMARY

An embodiment is directed to an optical proximity correction system comprising, a plurality of patch blocks which includes a plurality of patches including a segment information table, a plurality of slave devices which receive the segment information table from the plurality of patch blocks to generate a minimum patch table, and a master device which receives the minimum patch table from the plurality of slave devices, generates a segment average calculation table, and performs an optical proximity correction on the patches recorded in the segment average calculation table.

An embodiment is directed to a computer-readable medium including a program code, wherein when the program code is executed by a processor, the processor generates a plurality of patches including a segment information table, the processor receives the segment information table from the plurality of patches to generate a minimum patch table, and the processor generates a segment average calculation table from the minimum patch table and performs an optical proximity correction on the patches recorded in the segment average calculation table.

An embodiment is directed to an operating method of an optical proximity correction system, wherein the optical proximity correction system generates a plurality of patches including a segment information table, the optical proximity correction system receives the segment information table from the plurality of patches to generate a minimum patch table, and the optical proximity correction system generates a segment average calculation table from the minimum patch table, and performs an optical proximity correction on the patches recorded in the segment average calculation table.

BRIEF DESCRIPTION OF THE DRAWINGS

Features will become apparent to those of skill in the art by describing in detail example embodiments with reference to the attached drawings in which:

FIG. 7 is an example diagram for explaining a segment information table.

FIG. 9 is an example diagram for explaining a minimum patch table.

DETAILED DESCRIPTION

Figure 1:
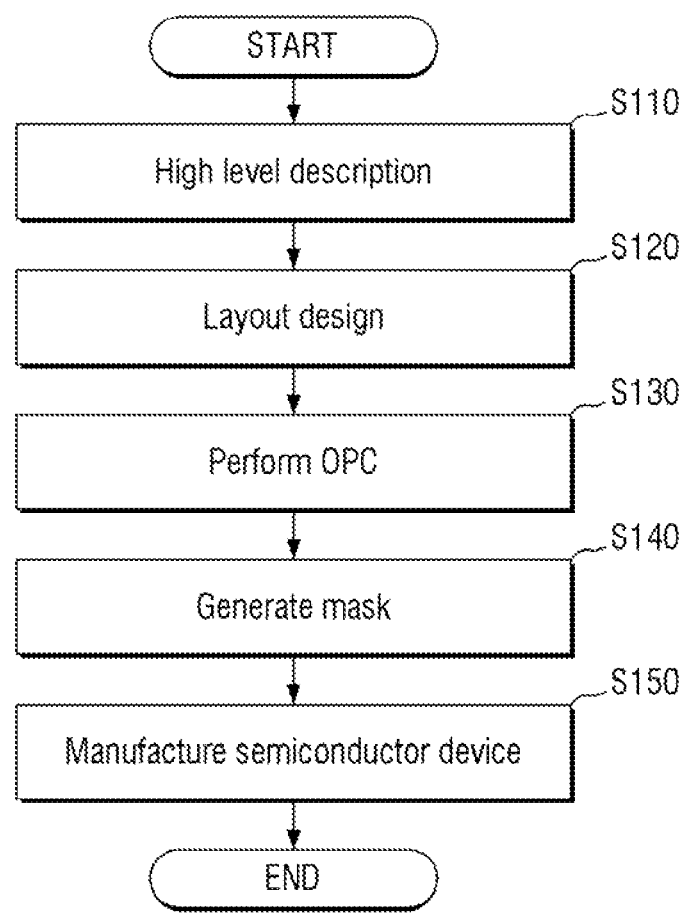
FIG. 1 is a flowchart showing a method for designing and manufacturing a semiconductor element.

FIG. 1 is a flowchart showing a method for designing and manufacturing a semiconductor element.

Referring to FIG. 1, a high-level design of a semiconductor integrated circuit may be performed in operation S110. The high-level design may mean description of the integrated circuit to be designed in a high-level language of a computer language. For example, a high-level language such as C language may be used. Circuits designed by the high-level design may be more specifically represented by register transfer level (RTL) coding or simulation. Furthermore, the code generated by the register transfer level coding may be converted into a netlist, and synthesized into the entire semiconductor element. The synthesized schematic circuit is verified by a simulation tool, and may be accompanied by an adjustment process depending on the verification result.

In operation S120, a layout design, for implementing the logically completed semiconductor integrated circuit on a silicon substrate, may be performed. For example, the layout design may be performed by referring to a schematic circuit synthesized by the high-level design or a netlist corresponding thereto. The layout design may include routing procedures for placing and connecting various standard cells provided by a cell library according to defined design rules.

The cell library for layout design may include information about an operation, a speed, a power consumption, and the like of a standard cell. The cell library for expressing a circuit of a specific gate level by layout is defined in most layout design tools. The layout may be a procedure that defines the form or size of a pattern for forming a transistor and metal wirings that are actually formed on the silicon substrate. For example, in order to actually form an inverter circuit on the silicon substrate, layout patterns such as a PMOS, an NMOS, a N-WELL, a gate electrode, and metal wirings to be placed on them may be suitably placed by the layout design tool. To this end, an appropriate inverter, among the inverters already defined in the cell library, may be first searched and selected.

In addition, routing on the selected and placed standard cells may be performed. For example, routing with the upper wirings may be performed on the selected and placed standard cells. The standard cells may be connected to each other according to the design through the routing procedure. These series of processes may be mostly performed automatically or manually by the layout design tool.

For example, the placement and routing of the standard cells may be performed automatically, using separate place & routing tools.

After routing, the layout may be verified as to whether there is a portion that violates a design rule. The verification may include a DRC (Design Rule Check) that verifies whether the layout is properly performed according to the design rule, an ERC (Electronical Rule Check) that verifies whether the layout is properly performed inside without an electric disconnection, an LVS (Layout vs. Schematic) check that checks whether the layout matches a gate-level netlist, and the like.

In operation S130, optical proximity correction (OPC) may be performed. The layout patterns obtained through layout design may be implemented on the silicon substrate, using a photolithography process, and the optical proximity correction may be used for correcting a distortion phenomenon that may occur in the photolithography process. That is, distortion phenomena such as refraction and process effects, caused by light characteristics at the time of exposure using a laid-out pattern, may be corrected through the optical proximity correction. The form and position of the designed layout patterns may be finely corrected (e.g., biased), by performing the optical proximity correction, to provide a corrected or updated layout patterns, e.g., as an updated design layout. Optical proximity correction according to some example embodiments will be described in detail below.

In operation S140, a photomask may be manufactured on the basis of the layout changed by the optical proximity correction. For example, a photomask may be manufactured in a manner of drawing layout patterns using a chrome film coated on a glass substrate.

In operation S150, a semiconductor element may be manufactured using the photomask. In the process of manufacturing a semiconductor element using the photomask, various types of exposure and etching processes may be repeated. The forms of the patterns configured at the time of layout design may be sequentially formed on the silicon substrate through such processes.

Figure 2:
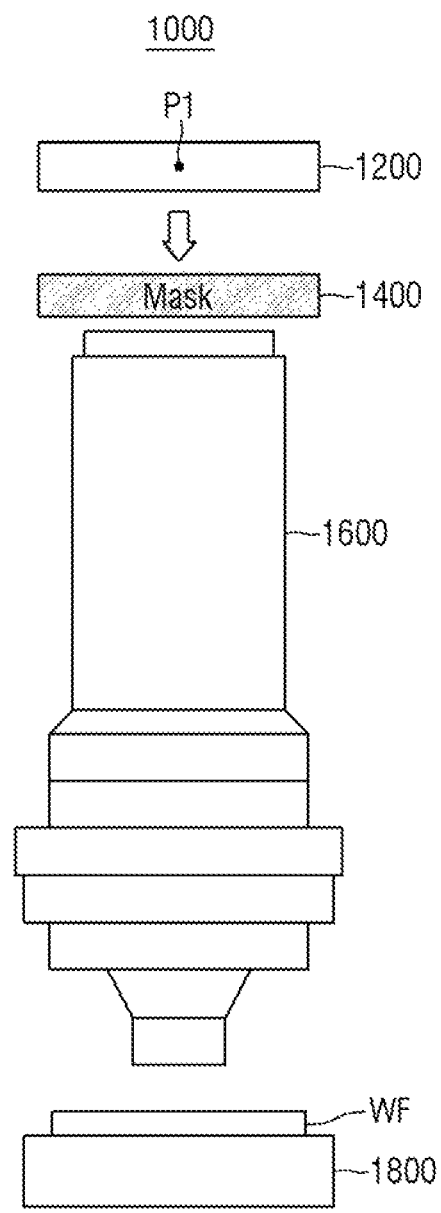
FIG. 2 is a schematic diagram showing a photolithography system used to manufacture a mask.

FIG. 2 is a schematic diagram showing a photolithography system using a mask.

Referring to FIG. 2, a photolithography system 1000 may include a light source 1200, a mask 1400, a reduction projection device 1600, and a wafer stage 1800. The photolithography system 1000 may further include constituent elements not shown in FIG. 2. For example, the photolithography system 1000 may further include a sensor used to measure a height and a slope of the surface of a wafer WF.

The light source 1200 may emit light. The light emitted by the light source 1200 may be irradiated to the mask 1400. For example, the light source 1200 may include an ultraviolet light source (e.g., a KrF light source having a wavelength of 234 nm, an ArF light source having a wavelength of 193 nm, and the like). For example, the light source 1200 may further include a collimator (not shown). The collimator may convert the ultraviolet light into a parallel light. The parallel light may be provided to the mask 1400. For example, the collimator may include a dipole aperture or quadruple aperture that is used to increase a depth of focus of the ultraviolet light.

The mask 1400 may include image patterns used to print a layout on the wafer WF. The image patterns may be formed by a transparent region and an opaque region. The transparent region may be formed by etching a metal layer on the mask 1400. The transparent region may allow transmission of the light emitted by the light source 1200. On the other hand, the opaque region may not allow transmission of light. The mask 1400 may be manufactured on the basis of optical proximity correction according to example embodiments. The optical proximity correction according to example embodiments will be described in detail below.

The reduction projection device 1600 may receive light transmitted through the transparent region of the mask 1400. The reduction projection device 1600 may provide the circuit patterns of the layout printed on the wafer WF from the image patterns of the mask 1400. The wafer stage 1800 may support the wafer WF.

The transparent region included in the image patterns of the mask 1400 may allow transmission of the light emitted from the light source 1200. The light having passed through the mask 1400 may be irradiated to the wafer WF through the reduction projection device 1600. As a result, a layout including the circuit patterns corresponding to the image patterns of the mask 1400 may be printed on the wafer WF.

As the degree of integration of the semiconductor process has increased, the distance between the image patterns of the mask 1400 has become very close, and the width of the transparent region has become very narrow. Due to such proximity, interference and diffraction of light may occur, and a distorted layout different from the desired layout may be printed on the wafer WF. When a distorted layout is printed on the wafer WF, the designed circuit may operate abnormally. Thus, a resolution enhancement technology, e.g., the optical proximity correction, may be used to prevent distortion of the layout. A degree of distortion, such as interference and diffraction of light, may be predicted in advance by the optical proximity correction. The image patterns to be formed on the mask 1400 may thus be biased in advance on the basis of the predicted results. As a result, a desired layout may be printed on the wafer.

In the optical proximity correction according to the present example embodiment, a hash value based on the characteristics of the segment itself and the surrounding conditions is calculated for each of the segments constituting the layout, using a hash function. Thus, each of the segments may have its own hash ID.

Further, an average value is calculated on the basis of the bias values of the segments having the same hash ID. As a result, it may be possible to more uniformly perform the optical proximity correction on the patterns having the same shape and the same surrounding conditions, and to provide a mask 1400 that is closer to the intended mask with efficiency.

At this time, a plurality of patches may be divided from the layout constituting the semiconductor chip. Each of the plurality of patches may have a plurality of hashes ID.

With miniaturized and complicated processes of the semiconductor chips, the number of patches for which the optical proximity correction is performed increases. Therefore, in order to effectively reduce a turnaround time (TAT) when performing the optical proximity correction, it may be desirable to reduce the number of patches used to perform the optical proximity correction. Furthermore, in order to improve the accuracy of optical proximity correction, it may be desirable to increase the population of each segment in which the average value is calculated. This will be described in detail below in FIG. 6.

Herein, example embodiments are described. In the following description, model-based optical proximity correction using computer simulation is assumed to be performed, but this is merely an example and example embodiments may be applied to other types of resolution enhancement technologies.

Figure 3:
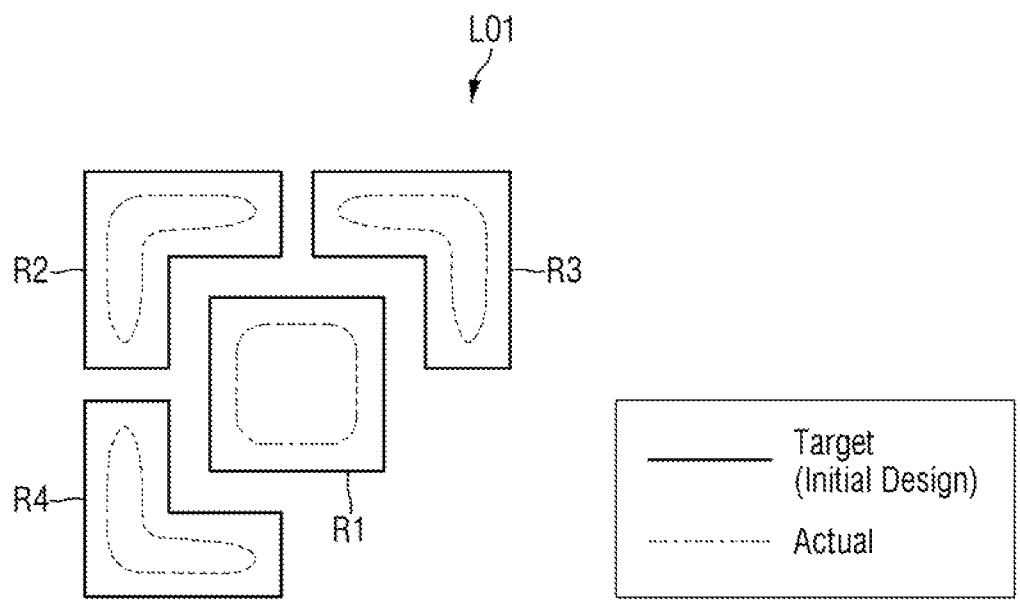
FIG. 3 is a diagram briefly showing the layout formed on the wafer.

FIG. 3 is a diagram briefly showing a layout formed on the wafer.

Referring to FIGS. 2 and 3, a layout LO1 may include a first circuit pattern R1 to a fourth circuit pattern R4 as an example. However, the form of the layout LO1 shown in FIG. 3 is merely an example.

In FIG. 3, a region shown by a solid line represents a target layout to be printed on the wafer WF. For example, a designer of the layout LO1 may print the layout LO1 of the first circuit pattern R1 to the fourth circuit pattern R4 along the solid line of FIG. 3 on the wafer WF. That is, the solid line of FIG. 3 indicates the layout to be printed as the target layout. The target layout is provided as an initial design layout.

In FIG. 3, a region shown by a dotted line represents the layout actually printed on the wafer WF. In fact, in the semiconductor manufacturing process, the mask 1400 may cause distortion such as interference and diffraction of light. Due to this distortion, unlike the designer's intention, the first circuit pattern R1 to the fourth circuit pattern R4 along the dotted line of FIG. 3 may be printed on the wafer WF. When the distorted layout is printed on the wafer WF, the designed circuit may operate abnormally, unlike the designer's intention.

The optical proximity correction may be performed to prevent distortion of layout. In the optical proximity correction, the design layout may be biased to reduce the error or deviation between the actual layout that is actually printed and the target layout, on the basis of the design layout. An example of optical proximity correction will be described referring to FIGS. 4 and 5.

Figure 4:
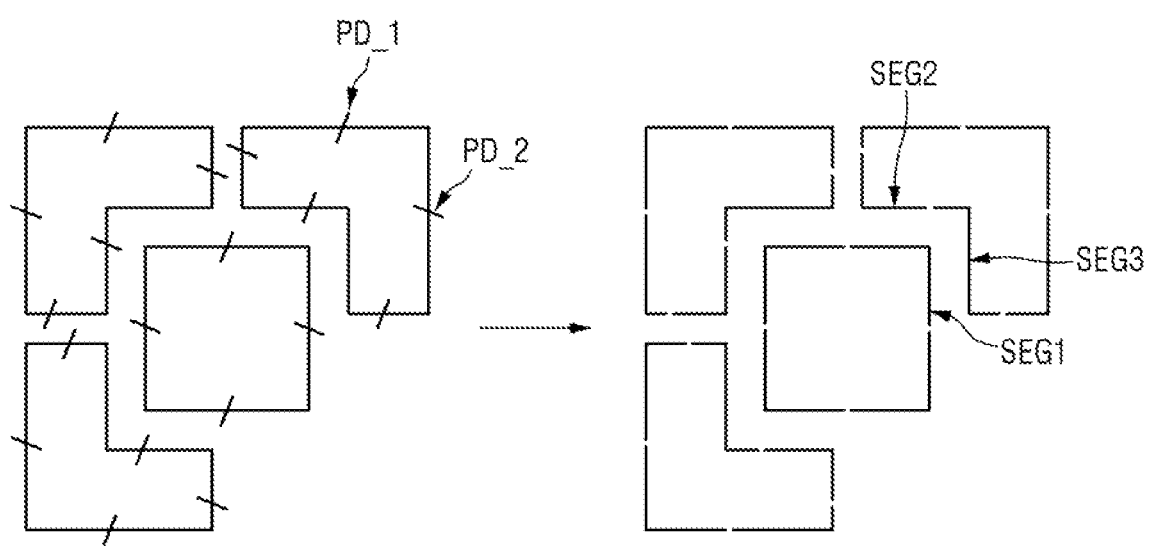
FIG. 4 is an example diagram which shows the process of dividing an outline of layout into a plurality of segments in the optical proximity correction.

FIG. 4 is an example diagram which shows the process of dividing an outline of layout into a plurality of segments in the optical proximity correction.

Referring to FIGS. 3 and 4, a process of dividing the outline of the design layout LO1 shown by the solid line in FIG. 3 into a plurality of segments will be described as an example.

A plurality of division points may be set on the outline of the design layout LO1. For example, a first division point PD_1 and a second division point PD_2 may be set on the outline of the design layout LO1. A segment SEG may be obtained on the basis of the first division point PD_1 and the second division point PD_2. In a similar manner, the outline of the design layout LO1 may be divided into a plurality of segments on the basis of a plurality of division points. The segments may mean the smallest unit in which a bias is executed.

Although the term "division" is used here, this may not mean a physical division. In FIG. 4, although a plurality of segments are expressed as being physically divided, this is conceptually provided for helping the understanding of the present example embodiment.

In the optical proximity correction, each of the divided segments may be subject to biasing. Each of the divided segments may be biased independently. For example, the segment SEG may be biased independent of the other segments, along one of a first direction (e.g., an outward direction of each circuit pattern corresponding to the plurality of segments) and a second direction (e.g., an inward direction of each circuit pattern corresponding to the plurality of segments). Each of the divided segments may be biased to reduce an error between the actual layout and the target layout.

The process of calculating the bias value may be a generally used process of calculating the bias values. Each of the segments may be biased on the basis of the calculated bias value. An example of an updated design layout obtained on the basis of the biased segments will be described with reference to FIG. 5.

Figure 5:
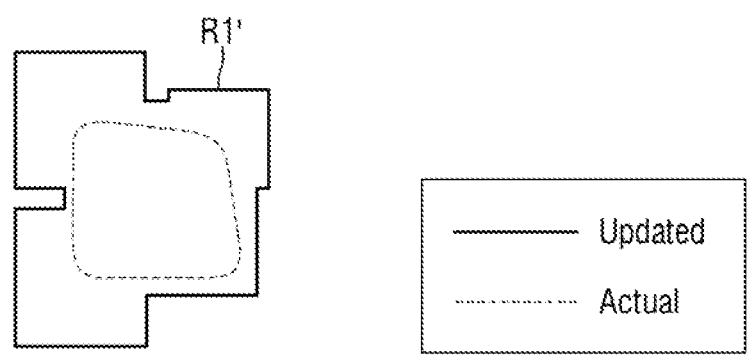
FIG. 5 is a diagram which shows the layout updated by the optical proximity correction as an example.

FIG. 5 is a diagram which shows the layout updated by the optical proximity correction as an example.

As an example, a new first circuit pattern R1' updated from the first circuit pattern R1 of FIG. 3 will be described for helping the understanding. The description corresponding to the second circuit pattern R2 to the fourth circuit pattern R4 of FIG. 3 will not be provided.

Referring to FIG. 5, a solid line of FIG. 5 indicates a new first correction pattern R1' included in the updated design layout. According to the procedure described with reference to FIG. 4, the outline of the first circuit pattern R1 of FIG. 3 may be divided into several segments, and each of the divided segments may be biased. As shown in FIG. 5, each of the segments may be biased along one of the first direction (e.g., the outward direction) and the second direction (e.g., the inward direction). As a result, the first correction pattern R1' may be obtained.

Each of the divided segments may be biased to reduce the error between the actual layout and the target layout. For example, a dotted line of FIG. 5 shows an actual layout to be actually printed on the basis of the updated design layout. By biasing each of the divided segments, the error between the actual layout and the target layout may be reduced.

Referring again to FIGS. 3 and 4, a left upper end segment, a left lower end segment, and a right upper end segment of the first circuit pattern R1 have the same surrounding conditions. Therefore, it may be the case that the left upper end segment, the left lower end segment, and the right upper end segment of the first circuit pattern R1 have the same bias value. Nevertheless, referring to FIG. 5, it is possible that the left upper end segment, the left lower end segment, and the upper right end segment of the first correction pattern R1' are asymmetrically biased. FIGS. 2 to 4 are merely examples.

In the actual optical proximity correction, there is a likelihood that the segments having the same surrounding conditions are biased differently from each other, e.g., due to numerical calculation errors. In particular, as the process of calculating the bias values corresponding to each of the divided segments is repeated, errors may be accumulated. When a distorted design layout is printed on the wafer WF due to the accumulated errors, the designed circuit may operate abnormally, unlike the designer's intention.

Therefore, in the present example embodiment, the hash value of the segment is calculated in consideration of the characteristics of the segment itself and the characteristics of the surrounding segment(s). Hash IDs of each of the segments may be generated accordingly. If there are two segments that are the same not only for those characteristics but also for the characteristics of adjacent segments, the hash IDs of each of the two segments will be the same as each other. An average value may be calculated from the bias values of the segments having the same hash ID.

A plurality of patches may be divided from the layout constituting the semiconductor chip. Each of the plurality of patches may have a plurality of hash IDs generated using a hash function for each of the aforementioned segments.

With miniaturized and complicated processes of the semiconductor chips, the number of patches to be performed the optical proximity correction increases. Therefore, in order to effectively reduce the TAT when performing the optical proximity correction, it may be desirable to reduce the number of patches used to perform the optical proximity correction. Further, in order to improve the accuracy of optical proximity correction, it may be desirable to increase the population of each segment in which the above-mentioned average value is calculated.

The optical proximity correction system and the operating method according to some example embodiments relating to this will be described in detail below.

Figure 6:
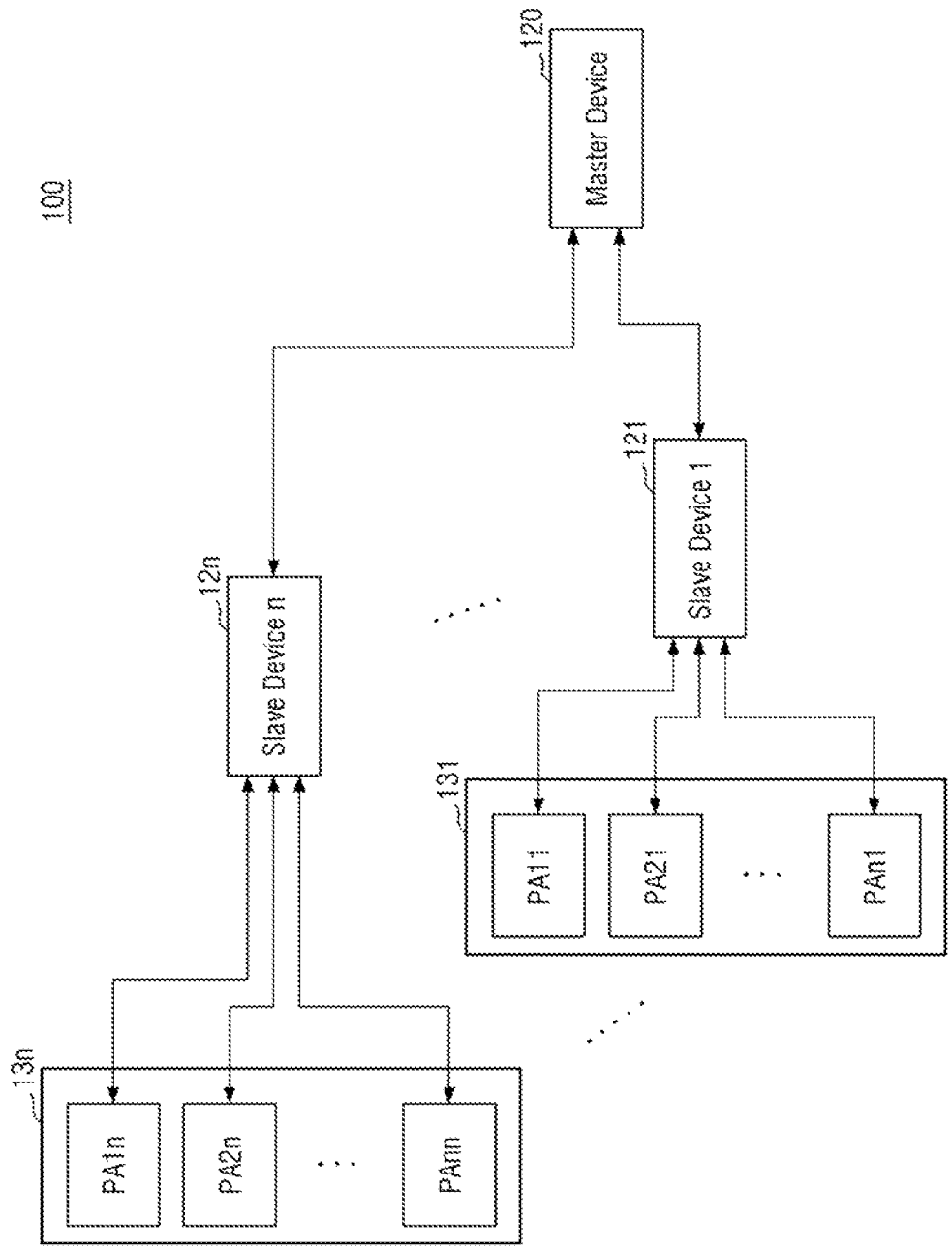
FIG. 6 is a block diagram which shows the optical proximity correction system according to some example embodiments.

FIG. 6 is a block diagram which shows the optical proximity correction system according to some example embodiments.

Referring to FIG. 6, the optical proximity correction system 100 may include a master device 120, slave devices 121 to 12$n$ (here, n is a natural number), and patch blocks 131 to 13$n$. The master device 120 and the slave devices 121 to 12$n$ may be implemented as separate computing devices, or the master device 120 and the slave devices 121 to 12$n$ may each be implemented as a plurality of processor cores. Although not shown in the drawing, the optical proximity correction system 100 may further include a storage medium in which an optical proximity correction tool for executing the optical proximity correction is stored. The optical proximity correction system 100 may further include a memory into which the optical proximity correction tool is loaded when the optical proximity correction tool is executed.

In some example embodiments, the optical proximity correction tool that performs the optical proximity correction according to example embodiments may be a computer program product, e.g., a tangible product, that includes computer-readable program codes, or a computer program product, e.g., a tangible product, that includes non-transitory computer-usable media including computer-readable program codes.

The master device 120 may be connected to the plurality of slave devices 121 to 12$n$, to control the plurality of slave devices 121 to 12$n$. Each of the plurality of slave devices 121 to 12$n$ may be connected to a patch block including the plurality of patches to control the plurality of patches.

In an example embodiment, the first slave device 121 is connected to the first patch block 131. The first patch block 131 includes a plurality of patches PA11 to PAn1. Further, an $n^{th}$ slave device 12$n$ is connected to an $n^{th}$ patch block 13$n$. The $n^{th}$ patch block 13$n$ includes a plurality of patches PA1$n$ to PAnn.

The plurality of patches connected to each of the plurality of slave devices 121 to 12$n$ may be the smallest unit that may be processed by each of the plurality of slave devices 121 to 12$n$.

Herein, it will be understood that descriptions of some of the plurality of slave devices 121 to 12$n$ may be similarly applied to the other remaining slave devices. Furthermore, it will be understood that descriptions of some of the plurality of patch blocks 131 to 13$n$ may be similarly applied to the other remaining patch blocks.

FIG. 7 is an example diagram for explaining a segment information table.

Referring to FIGS. 6 and 7, each of the plurality of patches included in each of the plurality of patch blocks 131 to 13$n$ may include segment information tables. Herein, although the first patch block 131 will be described as an example, it will be understood that the description thereof may also be applied to the remaining patch blocks.

Each of the plurality of patches PA11 to PAn1 included in the first patch block 131 includes segment information tables 141 to 14$n$.

For example, a first patch PA11 includes the segment information table 141, and an $n^{th}$ patch PAn1 includes a segment information table 14$n$.

The segment information table includes a hash ID generated using a hash function for a plurality of segments generated from each of the plurality of patches.

For example, the segment information table 141 in the first patch PA11 includes hash IDs such as 0x78, 0x81, 0x93, and 0x1A. Further, the segment information table 14$n$ in the $n^{th}$ patch PAn1 includes hash IDs such as 0x78, 0x85, and 0x93.

The segment information table includes number information (# of hash ID), e.g., a count, that is obtained by counting each of the plurality of hash IDs included in each of the plurality of patches. For example, the number information (# of hash ID) may be a count of a number of occurrences of the hash ID in the patch.

For example, referring to the example in FIG. 7, when the result of counting the 0x78 hash ID existing in the first patch PA11 is counted as nine, the segment information table 141 in the first patch PA11 records the counting number 9 for the 0x78 hash ID. When the result of counting the 0x81 hash ID existing in the first patch PA11 is counted as five, the segment information table 141 in the first patch PA11 records the counting number 5 for the 0x81 hash ID. When the result of counting the 0x93 hash ID existing in the first patch PA11 is counted as two, the segment information table 141 in the first patch PA11 records the counting number 2 for the 0x93 hash ID. When the result of counting the 0x1A hash ID existing in the first patch PA11 is counted as two, the segment information table 141 in the first patch PA11 records the counting number 9 for the 0x1A hash ID.

Still referring to the example in FIG. 7, when the result of counting the 0x78 hash ID existing in the $n^{th}$ patch PAn1 is counted as eight, the segment information table 14$n$ in the $n^{th}$ patch PAn1 records the counting number 8 for the 0x78 hash ID. When the result of counting the 0x85 hash ID existing in the $n^{th}$ patch PAn1 is counted as seven, the segment information table 14$n$ in the $n^{th}$ patch PAn1 records the counting number 7 for the 0x85 hash ID. When the result of counting the 0x93 hash ID existing in the $n^{th}$ patch PAn1 is counted as three, the segment information table 14$n$ in the $n^{th}$ patch PAn1 records the counting number 3 for the 0x93 hash ID.

Further, the segment information table includes the number (Total # of hash ID in patch) obtained by counting the total types of the plurality of hash IDs included in each of the plurality of patches.

For example, when the number of total types of hash IDs existing in the first patch PA11 is counted as a total of 2,000 including 0x78, 0x81, 0x93, and 0x1A, the segment information table 141 in the first patch PA11 records the number of total types of hash IDs existing in the first patch PA11 as 2,000 for each hash ID.

Further, e.g., when the number of total types of hash IDs existing in the $n^{th}$ patch PAn1 is counted as a total of 2,500 including 0x78, 0x85, and 0x93, the segment information table 14$n$ in the $n^{th}$ patch PAn1 records the number of total types of hash IDs existing in the $n^{th}$ patch PAn1 as 2,500 for each hash ID.

Figure 8:
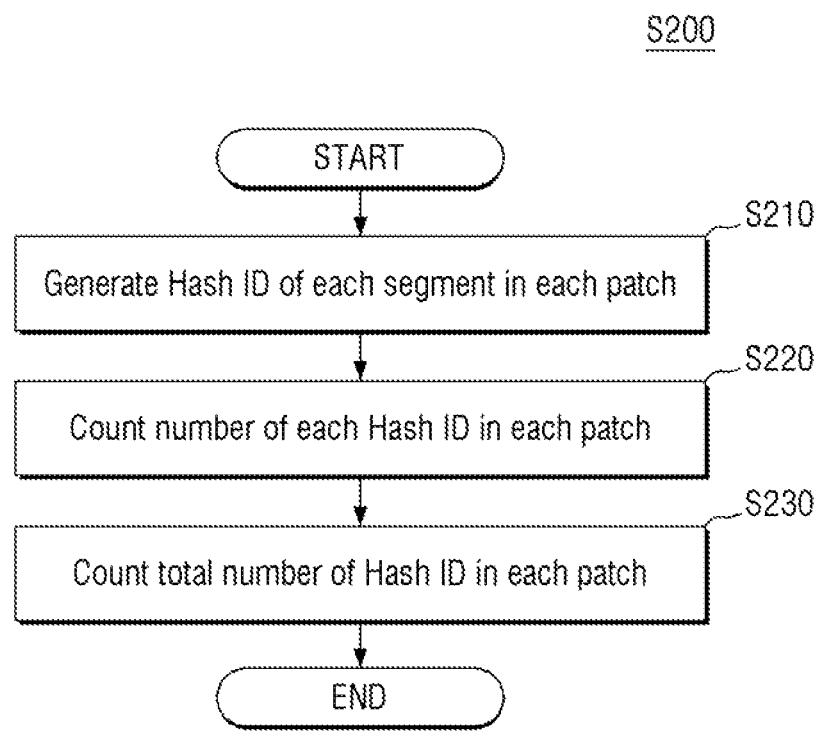
FIG. 8 is a flowchart for explaining the segment information table generation operation.

FIG. 8 is a flowchart for explaining the above-described segment information table generation operation.

Referring to FIGS. 7 to 8, hash IDs, which are generated using a hash function for a plurality of segments generated from each of the plurality of patches, are recorded in the segment information table (S210).

After that, the number (# of hash ID) information obtained by counting each of the plurality of hash IDs included in each of the plurality of patches is recorded in the segment information table (S220).

After that, the number (Total # of hash ID in patch) obtained by counting the number of total types of the plurality of hash IDs included in each of the plurality of patches is recorded in the segment information table.

The order of steps S220 and S230 may be changed from each other or may be performed in parallel.

FIG. 9 is an example diagram for explaining a minimum patch table.

Referring to FIGS. 6, 7, and 9, each of the plurality of slave devices 121 to 12$n$ may receive a plurality of segment information tables from patch blocks 131 to 13$n$ connected to each of the plurality of slave devices 121 to 12$n$ to generate the minimum patch table.

Herein, although the operation of the first slave device 121 and the $n^{th}$ slave device 12$n$ will be described, it will be understood that the description thereof may be applied to the remaining slave devices.

The first slave device 121 receives a plurality of segment information tables from the plurality of patches PA11 to PA$n$1. After that, the first slave device 121 generates the minimum patch table 151, using the plurality of segment information tables received from the plurality of patches PA11 to PA$n$1.

Herein, the segment information tables received by the first slave device 121 will be described as, e.g., the segment information tables 141 to 14$n$ of FIG. 7.

The first slave device 121 compares the same hash IDs among the plurality of hash IDs on the plurality of segment information tables 141 to 14$n$ received from the plurality of patches PA11 to PA$n$1, and records the patch having the larger total types of number (Total # of hash ID in patch) in the minimum patch table 151.

For example, the first slave device 121 compares the same 0x78 hash IDs in the segment information table 141 to the segment information table 14$n$. At this time, 2,500, which is the number of total types for 0x78 hash ID of the segment information table 14$n$ in the $n^{th}$ patch PA$n$1, is assumed to be the highest. Therefore, the first slave device 121 records information, which is stored in the segment information table 14$n$ of the $n^{th}$ patch PA$n$1, in the minimum patch table 151 as a 0x78 hash ID.

Similarly, the first slave device 121 compares the same 0x85 hash ID in the segment information table 141 to the segment information table 14$n$. At this time, 2,500, which is the number of total types for 0x85 hash ID of the segment information table 14$n$ in the $n^{th}$ patch PA$n$1, is assumed to be the highest. Therefore, the first slave device 121 records the information, which is stored in the segment information table 14$n$ of the $n^{th}$ patch PA$n$1, in the minimum patch table 151 as a 0x85 hash ID.

Similarly, the first slave device 121 compares the same 0x81 hash IDs in the segment information table 141 to the segment information table 14$n$. At this time, 2,000, which is the number of total types for 0x81 hash ID of the segment information table 141 in the first patch PA11, is assumed to be the highest. Therefore, the first slave device 121 records the information, which is stored in the segment information table 141 of the first patch PA11, in the minimum patch table 151 as a 0x81 hash ID.

Similarly, the first slave device 121 compares the same 0x93 hash ID in the segment information table 141 to the segment information table 14$n$. At this time, 2,500, which is the number of total types for 0x93 hash ID of the segment information table 14$n$ in the $n^{th}$ patch PA$n$1, is assumed to be the highest. Therefore, the first slave device 121 records the information, which is stored in the segment information table 14$n$ of the $n^{th}$ patch PA$n$1, in the minimum patch table 151 as a 0x93 hash ID.

Similarly, the first slave device 121 compares the same 0x1A hash IDs in the segment information table 141 to the segment information table 14$n$. At this time, 2,000, which is the number of total types for the 0x1A hash ID of the segment information table 141 in the first patch PA11, is assumed to be the highest. Therefore, the first slave device 121 records the information, which is stored in the segment information table 141 of the first patch PA11, in the minimum patch table 151 as a 0x1A hash ID.

A type in which the first slave device 121 records the minimum patch table 151 may also be applied to a type in which the $n^{th}$ slave device 12$n$ generates the minimum patch table 15$n$ using a plurality of segment information tables received from the 1$n^{th}$ patch PA1$n$ to the $nn^{th}$ patch PA$nn$. Therefore, the description of the minimum patch table 15$n$ will not be provided.

Figure 10:
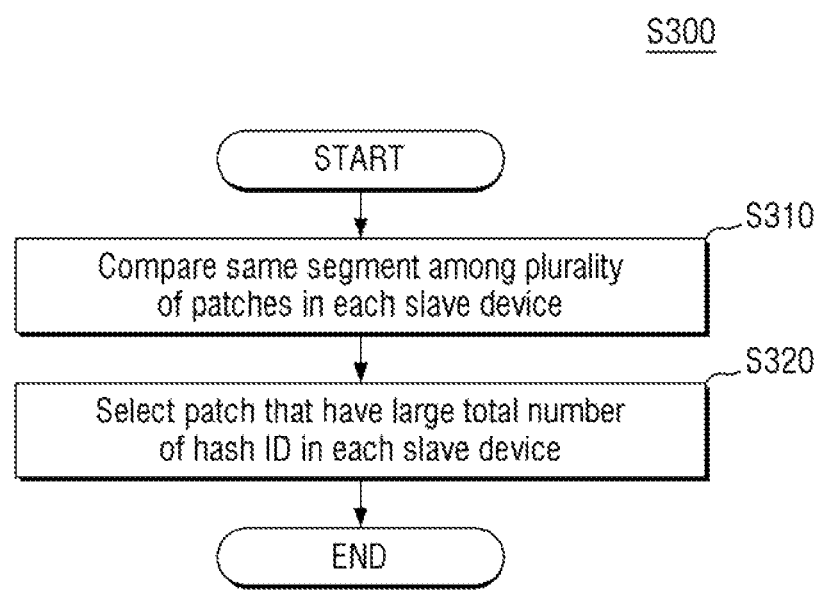
FIG. 10 is a flowchart for explaining the minimum patch table generation operation.

FIG. 10 is a flowchart for explaining the above-described minimum patch table generation operation.

Referring to FIGS. 6, 9, and 10, each of the plurality of slave devices 121 to 12$n$ compares the same hash IDs among the plurality of hash IDs, with reference to the segment information tables received from the plurality of patches (S310).

At this time, for the same hash IDs, a patch including a hash ID having a higher total type of hash ID is selected and recorded in the minimum patch table (S320).

Because each of the plurality of slave devices 121 to 12$n$ selects only the patch having the higher total type of hash ID for the same hash ID with reference to the segment information table received from the plurality of patches, it is possible to reduce the runtime or TAT for the optical proximity correction system according to some example embodiments when performing the optical proximity correction operation.

Figure 11:
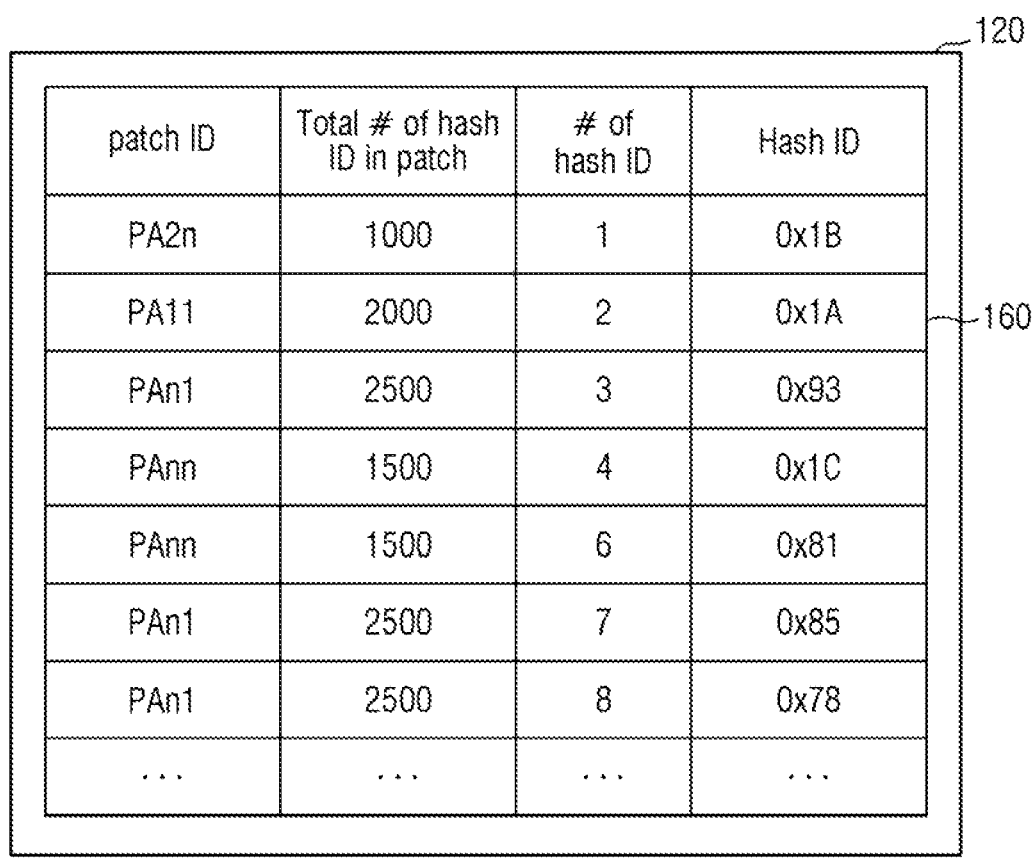
FIG. 11 is an example diagram for explaining a segment average calculation table.

FIG. 11 is an example diagram for explaining a segment average calculation table.

Referring to FIGS. 6, 9, and 11, the master device 120 may generate a segment average calculation table 160, with reference to a plurality of minimum patch tables received from the plurality of slave devices 121 to 12$n$.

Herein, a case will be described as an example in which the master device 120 generates the segment average calculation table 160, using the plurality of minimum patch tables 151 to 15$n$ received from the first slave device 121 to the $n^{th}$ slave device 12$n$.

The master device 120 reduces the runtime or TAT for performing the optical proximity correction operation by generating the minimum patch table. However, in order to prevent a decrease in accuracy of the optical proximity correction operation, the population for calculating the average value of the bias values of the segments corresponding to each hash ID may be maximized.

In an example embodiment, the master device 120 compares the number of hash IDs (# of hash ID) for the segments having the same hash ID, from the minimum patch table 151 received from the first slave device 121 to the minimum patch table 15*n* received from the n*th* slave device 12*n*.

At this time, in order to improve the accuracy of the optical proximity correction operation, the master device 120 selects the patch including the hash IDs having the larger number of hash IDs (# of hash ID) to maximize the population for calculating the average value of the bias values of the segments corresponding to each hash ID.

For example, with reference to the minimum patch table 151 received from the first slave device 121 to the minimum patch table 15*n* received from the n*th* slave device 12*n*, the master device 120 determines that one among the numbers of 0x1B hash IDs included in the 2n*th* patch PA2*n* is the largest for the 0x1B hash ID, and records information about the 2n*th* patch PA2*n* in the segment average calculation table 160 for the 0x1B hash ID.

Further, with reference to the minimum patch table 151 received from the first slave device 121 to the minimum patch table 15*n* received from the n*th* slave device 12*n*, the master device 120 determines that two among the number of 0x1A hash IDs included in the first patch PA11 are the largest for the 0x1A hash ID, and records information about the first patch PA11 in the segment average calculation table 160 for the 0x1A hash ID.

Since the above description is similarly applicable to other hash IDs such as 0x93, 0x1C, 0x81, 0x85, and 0x78 of the segment average calculation table 160, the description thereof will not be provided.

Figure 12:
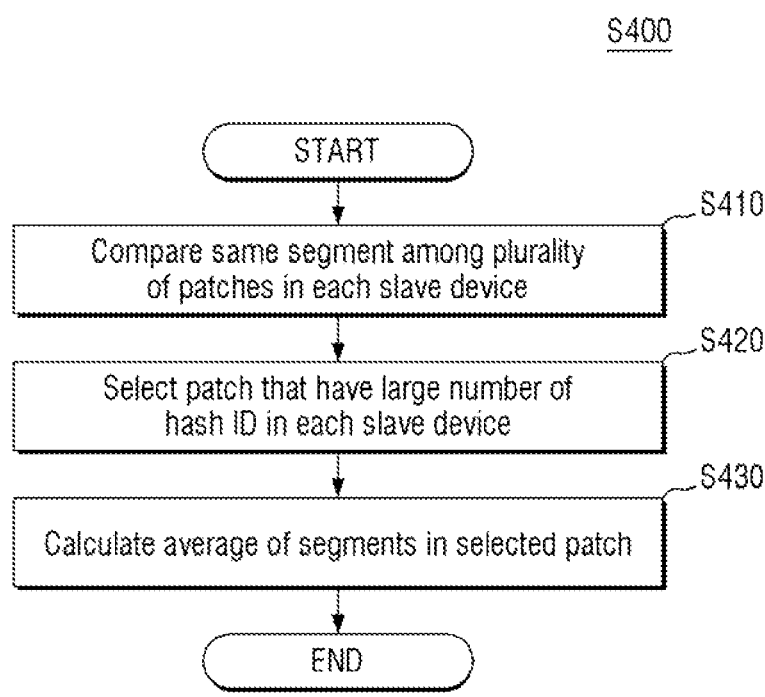
FIG. 12 is a flowchart for explaining the segment average calculation table generation operation.

FIG. 12 is a flowchart for explaining the above-described segment average calculation table generation operation.

Referring to FIGS. 6, 11, and 12, the master device 120 compares the same hash ID with reference to a plurality of minimum patch tables received from the plurality of slave devices 121 to 12*n* (S410).

After that, the master device 120 compares the number of the same hash IDs in the patch to which the hash IDs belong, and selects a patch having a larger number of hash ID (# of hash ID) (S420).

After that, the master device 120 may perform the optical proximity correction operation, by calculating the biasing average value on the segments of the patch recorded in the segment average calculation table 160 (S430).

Figure 13:
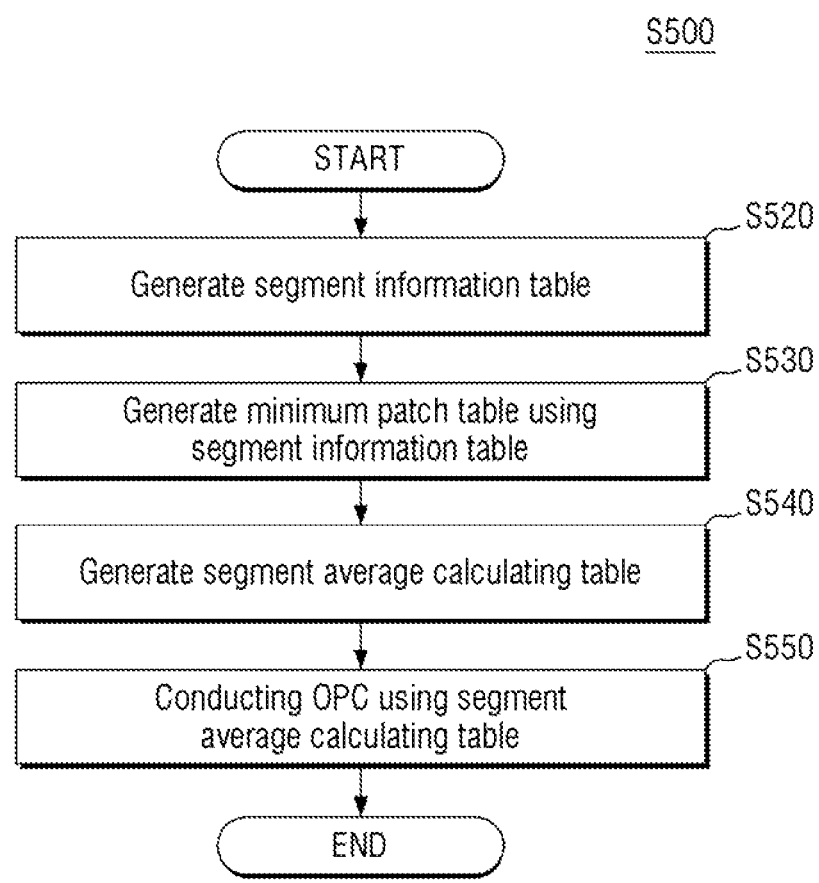
FIG. 13 is an example flowchart which shows the operation of the optical proximity correction system according to some example embodiments.

FIG. 13 is an example flowchart which shows the operation of the optical proximity correction system according to some example embodiments.

Referring to FIGS. 6 and 13, the optical proximity correction system 100 generates, e.g., a plurality of patches PA11 to PA*n*1 including the segment information tables 141 to 14*n* of FIG. 7 (S520). The process of generating the segment information tables is as described above through FIGS. 7 and 8.

After that, the optical proximity correction system 100, more specifically, each of the slave devices 121 to 12*n*, generates a minimum patch table on the basis of a plurality of segment information tables (S530). The process of generating the minimum patch table is as described above through FIGS. 9 and 10.

After that, the optical proximity correction system 100, more specifically, the master device 120, generates a segment average calculation table on the basis of a plurality of minimum patch tables (S540). The process of generating the segment average calculation table is as described above through FIGS. 11 and 12.

After that, the optical proximity correction system 100 may perform the optical proximity correction on the basis of the segment average calculation table (S550).

By way of summation and review, a semiconductor element may be fabricated by a photolithography process. Through the photolithography process, layouts, e.g., a design layout including various patterns, may be used to print or form structures on a semiconductor wafer. As the degree of integration of the process increases, a distance between image patterns of a mask may become very close and interference and diffraction of light may occur due to such proximity. This may result in a distorted layout (i.e., a layout that is different from a desired layout) being printed or formed on the wafer. To reduce or prevent such distortion of the layout, a resolution enhancement technology such as optical proximity correction may be used. However, when performing the optical proximity correction for patterns having a same shape and a same surrounding conditions, it may be important to reduce a turnaround time (TAT) and efficiently perform the optical proximity correction.

As described above, embodiments may provide an optical proximity correction system having reduced turnaround time (TAT). Embodiments may also provide a computer-readable medium containing code for a method for operating an optical proximity correction system having reduced TAT. Embodiments may also provide a method for operating an optical proximity correction system having reduced TAT.

The optical proximity correction system 100 according to some example embodiments may improve the accuracy of optical proximity correction, by maximizing a population for calculating the biasing average value for each of the segments, while reducing runtime or TAT of the optical proximity correction, using the minimum patch.

An example embodiment is directed to a mask fabricating method that includes performing optical proximity correction on a design layout, e.g., an initial design layout, to provide an updated design layout. The method further includes fabricating a mask, e.g., the mask 1400, based on the updated design layout. Another example embodiment is directed to fabricating a semiconductor device using the mask.

Example embodiments have been disclosed herein, and although specific terms are employed, they are used and are to be interpreted in a generic and descriptive sense only and not for purpose of limitation.

Constituent elements described referring to terms such as a part or a unit, a module, a block, and a device (~ or, ~ er) used in the detailed description, and functional blocks shown in the drawings may be implemented in the form of software or hardware or a combination thereof. As an example, the software may be a machine code, a firmware, an embedded code, and application software. For example, the hardware may include an electrical circuit, an electronic circuit, a processor, a computer, an integrated circuit, integrated circuit cores, a pressure sensor, an inertial sensor, a MEMS (microelectromechanical system), a passive element, or combinations thereof.

In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present example embodiment as set forth in the following claims.

What is claimed is:

1. An optical proximity correction system, comprising:
a plurality of patch blocks, each patch block of the plurality of patch blocks including a plurality of patches, each patch of the plurality of patches including a segment information table;
a plurality of slave devices each slave device of the plurality of slave devices configured to receive a plurality of segment information tables from the plurality of patch blocks, wherein each slave device of the plurality of slave devices is configured to generate a minimum patch table; and
a master device configured to receive a plurality of the minimum patch tables from the plurality of slave devices, the master device configured to generate a segment average calculation table and perform an optical proximity correction on patches recorded in the segment average calculation table,
wherein the segment information table includes:
a plurality of hash IDs that are generated by calculating hash values corresponding to each of a plurality of segments generated from the plurality of patches, wherein a hash function is used to generate the plurality of hash IDs for the plurality of segments,
a number obtained by counting occurrences of each of the plurality of hash IDs included in each of the plurality of patches, and
a number obtained by counting a number of total types of the plurality of hash IDs included in each of the plurality of patches.

2. The optical proximity correction system as claimed in claim 1, wherein the optical proximity correction is performed to change a layout pattern of a semiconductor chip to an updated layout pattern that is different from the layout pattern.

3. The optical proximity correction system as claimed in claim 1, wherein each of the plurality of slave devices compares same hash IDs among the plurality of hash IDs in the plurality of patches with respect to the segment information tables, selects a patch having the largest number of total types, and generates the minimum patch table.

4. The optical proximity correction system as claimed in claim 3, wherein the master device compares same hash IDs among the plurality of hash IDs in the plurality of patches with respect to the minimum patch tables, selects a patch having the largest number obtained by counting occurrences of each of the plurality of hash IDs, and generates the segment average calculation table.

5. The optical proximity correction system as claimed in claim 1, wherein the segment average calculation table comprises a plurality of hash IDs corresponding to a plurality of segments and wherein the master device calculates an average value of bias values for each segment in the segment average calculation table to perform the optical proximity correction.

6. The optical proximity correction system as claimed in claim 1, wherein the plurality of patches are the smallest units capable of being processed by each slave device of the plurality of slave devices.

7. A computer-readable medium including a program code,
wherein when the program code is executed by one of more processors, the one or more processors are configured to:
generate a plurality of patches, each patch of the plurality of patches including a segment information table,
receive a plurality of segment information tables from the plurality of patches and generate a minimum patch table from the plurality of segment information tables,
generate a segment average calculation table from a plurality of minimum patch tables, and
perform an optical proximity correction on patches recorded in the segment average calculation table,
wherein the segment information includes:
a plurality of hash IDs that are generated by calculating hash values corresponding to each of a plurality of segments generate from the plurality of patches, wherein a hash function is used to generate the plurality of hash IDs for the plurality of segments,
a number obtained by counting occurrences of each of the plurality of hash IDs included in each of the plurality of patches, and
a number obtained by counting a number of total types of the plurality of hash IDs included in each of the plurality of patches.

8. The computer-readable medium as claimed in claim 7, wherein the optical proximity correction is performed to change a layout pattern of a semiconductor chip to an updated layout pattern that is different from the layout pattern.

9. The computer-readable medium as claimed in claim 7, wherein a first processor of the of one or more processors compares same hash IDs among the plurality of hash IDs in the plurality of patches with respect to the segment information tables, selects a patch having the largest number of total types, and generates the minimum patch table.

10. The computer-readable medium as claimed in claim 9, wherein a second processor of the one or more processors compares the same hash IDs among the plurality of hash IDs in the plurality of patches with respect to the minimum patch tables, selects a patch having the largest number obtained by counting occurrences of each of the plurality of hash IDs, and generates the segment average calculation table.

11. The computer-readable medium as claimed in claim 7, wherein the segment average calculation table comprises a plurality of hash IDs corresponding to a plurality of segments, and wherein one or more processors calculate an average value of bias values for each segment in the segment average calculation table to perform the optical proximity correction.

12. The computer-readable medium as claimed in claim 7, wherein the plurality of patches are the smallest units capable of being processed by each slave device of plurality of slave devices.

13. An operating method of an optical proximity correction system, the operating method comprising:
generating a plurality of patches, wherein each patch of the plurality of patches includes a segment information table,
receiving a plurality of segment information tables from the plurality of patches to generate a plurality of minimum patch tables,
generating a segment average calculation table from the plurality of minimum patch tables, and performing an optical proximity correction on patches recorded in the segment average calculation tables,
wherein the segment information table includes:
a plurality of hash IDs that are generated by calculating hash values corresponding to each of a plurality of segments generated from the plurality of patches, wherein a hash function is used to generate of hash IDs for the plurality of segments, a number obtained by counting occurrences of each of the plurality of hash IDs included in each of the patches, and a number obtained by counting a number of total types of the plurality of hash IDs included in each of the plurality of patches.

14. The operating method of the optical proximity correction system as claimed in claim 13, wherein the optical proximity correction is performed to change a layout pattern of a semiconductor chip to an updated layout pattern that is different from the layout patter.

15. The operating method of the optical proximity correction system as claimed in claim 13, wherein the optical proximity correction system compares same hash IDs among the plurality of hash IDs in the plurality of patches with respect to the segment information tables, selects a patch having the largest number of total types, and generates a minimum patch table.

16. The operating method of the optical proximity correction system as claimed in claim 15, wherein the optical proximity correction system compares the same hash IDs among the plurality of hash IDs in the plurality of patches with respect to the minimum patch tables, selects a patch having the largest number obtained by counting occurrences of each of the plurality of hash IDs, and generates the segment average calculation table.

17. The operating method of the optical proximity correction system as claimed in claim 13, wherein the segment average calculation table comprises a plurality of hash IDs corresponding to a plurality of segments, and wherein the optical proximity correction system calculates an average value of bias values for each segment in the segment average calculation table to perform the optical proximity correction.

* * * * *